US010107981B2

(12) United States Patent
Chen et al.

(10) Patent No.: US 10,107,981 B2
(45) Date of Patent: Oct. 23, 2018

(54) CABLE DISTRIBUTION DEVICE FOR OPTICAL NETWORK

(71) Applicant: Huawei Technologies Co., Ltd., Shenzhen (CN)

(72) Inventors: Jinghui Chen, Shenzhen (CN); Siwen Shu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/941,318

(22) Filed: Nov. 13, 2015

(65) Prior Publication Data

US 2016/0070081 A1 Mar. 10, 2016

Related U.S. Application Data

(63) Continuation of application No. PCT/CN2014/084152, filed on Aug. 12, 2014.

(30) Foreign Application Priority Data

Aug. 13, 2013 (CN) .......................... 2013 1 0350283

(51) Int. Cl.
H04B 10/27 (2013.01)
G02B 6/44 (2006.01)
(Continued)

(52) U.S. Cl.
CPC ......... *G02B 6/4453* (2013.01); *G02B 6/3897* (2013.01); *G02B 6/428* (2013.01);
(Continued)

(58) Field of Classification Search
USPC ............................................ 385/135; 398/66
See application file for complete search history.

(56) References Cited

U.S. PATENT DOCUMENTS

2009/0060439 A1* 3/2009 Cox ..................... G02B 6/3897
385/135
2009/0269019 A1 10/2009 Andrus et al.
(Continued)

FOREIGN PATENT DOCUMENTS

CN 101650457 A 2/2010
CN 101806943 A 8/2010
(Continued)

*Primary Examiner* — David Payne
*Assistant Examiner* — Omar S Ismail
(74) *Attorney, Agent, or Firm* — Slater Matsil, LLP

(57) ABSTRACT

The present invention discloses a cable distribution device for an intelligent optical distribution network (iODN), comprising a tray and a cable distribution structure for the iODN, where the tray is provided with multiple first interfaces, the cable distribution structure for the iODN includes multiple attachment plates, an upper cover, a circuit board, and a bottom cover, the circuit board is installed on the upper cover, the upper cover is installed on the bottom cover, one end of each attachment plate is installed on the bottom cover, and the other end of each attachment plate is inserted into the first interface of the tray. the cable distribution structure for the iODN may be installed on a tray by using attachment plates, so that an existing ODN can be transformed into an iODN without transforming a structure of the tray and interrupting an optical fiber transmission service.

19 Claims, 16 Drawing Sheets

(51) Int. Cl.
*G02B 6/42* (2006.01)
*H04Q 1/02* (2006.01)
*G02B 6/38* (2006.01)

(52) U.S. Cl.
CPC ......... *G02B 6/4285* (2013.01); *G02B 6/4452* (2013.01); *H04B 10/27* (2013.01); *H04Q 1/135* (2013.01); *G02B 6/3825* (2013.01); *G02B 6/3895* (2013.01); *G02B 6/4454* (2013.01)

(56) References Cited

U.S. PATENT DOCUMENTS

| | | | | |
|---|---|---|---|---|
| 2009/0324189 A1* | 12/2009 | Hill | ............ | G02B 6/4454 385/135 |
| 2011/0091170 A1* | 4/2011 | Bran de Leon | ...... | G02B 6/4452 385/100 |
| 2011/0116748 A1 | 5/2011 | Smrha et al. | | |
| 2011/0164853 A1 | 7/2011 | Corbille et al. | | |
| 2013/0188966 A1* | 7/2013 | Wu | ............ | H04B 10/27 398/139 |
| 2013/0287356 A1* | 10/2013 | Solheid | ............ | G02B 6/4452 385/134 |
| 2014/0044430 A1* | 2/2014 | Dress | ............ | H04B 10/801 398/66 |

FOREIGN PATENT DOCUMENTS

| | | |
|---|---|---|
| CN | 102165351 A | 8/2011 |
| CN | 102419465 A | 4/2012 |
| CN | 103064160 A | 4/2013 |

* cited by examiner

CABLE DISTRIBUTION DEVICE FOR OPTICAL NETWORK

This application is a continuation of International Application No. PCT/CN2014/084152, filed on Aug. 12, 2014, which claims priority to Chinese Patent Application No. 201310350283.8, filed on Aug. 13, 2013, both of which are hereby incorporated by reference in their entireties.

TECHNICAL FIELD

The present invention relates to the field of fiber network management, and in particular, to a cable distribution device for an optical network.

BACKGROUND

In the field of optical network cable distribution, with the rise and popularization of intelligent optical networks, conventional optical distribution network (ODN) have been gradually replaced. However, for existing networks, conventional ODNs have almost reached full coverage. In consideration of costs, intelligent optical distribution network (IODN) are generally used for newly established networks, and it is impossible for an operator to completely discard conventional ODNs; therefore, a service demand for intelligently transforming a conventional ODN occurs. However, in the prior art, a newly developed intelligent tray is used to replace a tray in an existing ODN, so as to transform the conventional ODN into an intelligent optical distribution network. In such a transformation manner, a service needs to be interrupted during transformation, which causes a complex operation and high costs, and brings inconvenience to a user.

SUMMARY

An objective of the present invention is to solve a problem in the prior art of high costs for transforming a cable distribution device for an optical network.

To achieve the foregoing objective, implementation manners of the present invention provide the following technical solutions:

A cable distribution device for an optical network is provided, including a tray and a cable distribution structure for an intelligent optical network, where the tray is provided with multiple first interfaces, the cable distribution structure for an intelligent optical network includes multiple attachment plates, an upper cover, a circuit board, and a bottom cover, the circuit board is installed on the upper cover, the upper cover is installed on the bottom cover, one end of each attachment plate is installed on the bottom cover, and the other end of each attachment plate is inserted into the first interface of the tray, so that the cable distribution structure for an intelligent optical network is installed on the tray.

The cable distribution structure for an intelligent optical network further includes multiple adapters, the bottom cover is provided with multiple second interfaces, and the adapter is installed on the second interface.

The cable distribution structure for an intelligent optical network further includes multiple fiber patch cords and multiple pigtails, the fiber patch cord is installed at one end of the adapter, and the pigtail is installed at the other end of the adapter and is electrically connected to the fiber patch cord.

The cable distribution structure for an intelligent optical network further includes a control interface, and the control interface is disposed at one end of the circuit board and is configured to implement functions of reading and writing port information.

The cable distribution structure for an intelligent optical network further includes multiple chips, the chip is fastened to one side edge of the circuit board and is fixedly connected to the fiber patch cord, and the chip is electrically connected to the control interface and is configured to record the port information and control the functions of reading and writing the port information.

Each of the first interfaces is provided with a first slot, a second slot, and a receiving groove, the first slot and the second slot are located at two sides of the receiving groove and are in communication with the receiving groove, the attachment plate includes a first clamping portion, a second clamping portion, and a body, the first clamping portion and the second clamping portion protrude from two sides of one end of the body, the body is received in the receiving groove, the first clamping portion is clamped in the first slot, and the second clamping portion is clamped in the second slot, so that the attachment plate is installed on the tray.

The attachment plate is further provided with a positioning groove, the positioning groove is located at the other end of the body, the bottom cover is provided with a positioning hole, the cable distribution structure for an intelligent optical network further includes a fastener, and the fastener passes through the positioning groove and is fastened to the positioning hole, so that the attachment plate is installed on the bottom cover.

The positioning groove is strip-shaped, so that relative positions of the attachment plate and the bottom cover may be adjusted.

The first clamping portion is provided with at least one first projecting portion, and the first projecting portion is in interference fit with an inner wall of the first slot.

The second clamping portion is provided with at least one second projecting portion, and the second projecting portion is in interference fit with an inner wall of the second slot.

According to the cable distribution device for an optical network provided in the present invention, a cable distribution structure for an intelligent optical network may be installed on a tray by using attachment plates, so that an existing ODN can be transformed into an IODN without transforming a structure of the tray and interrupting an optical fiber transmission service, thereby solving problems in the prior art of high costs and inconvenience to a user that are caused by transformation of the tray.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
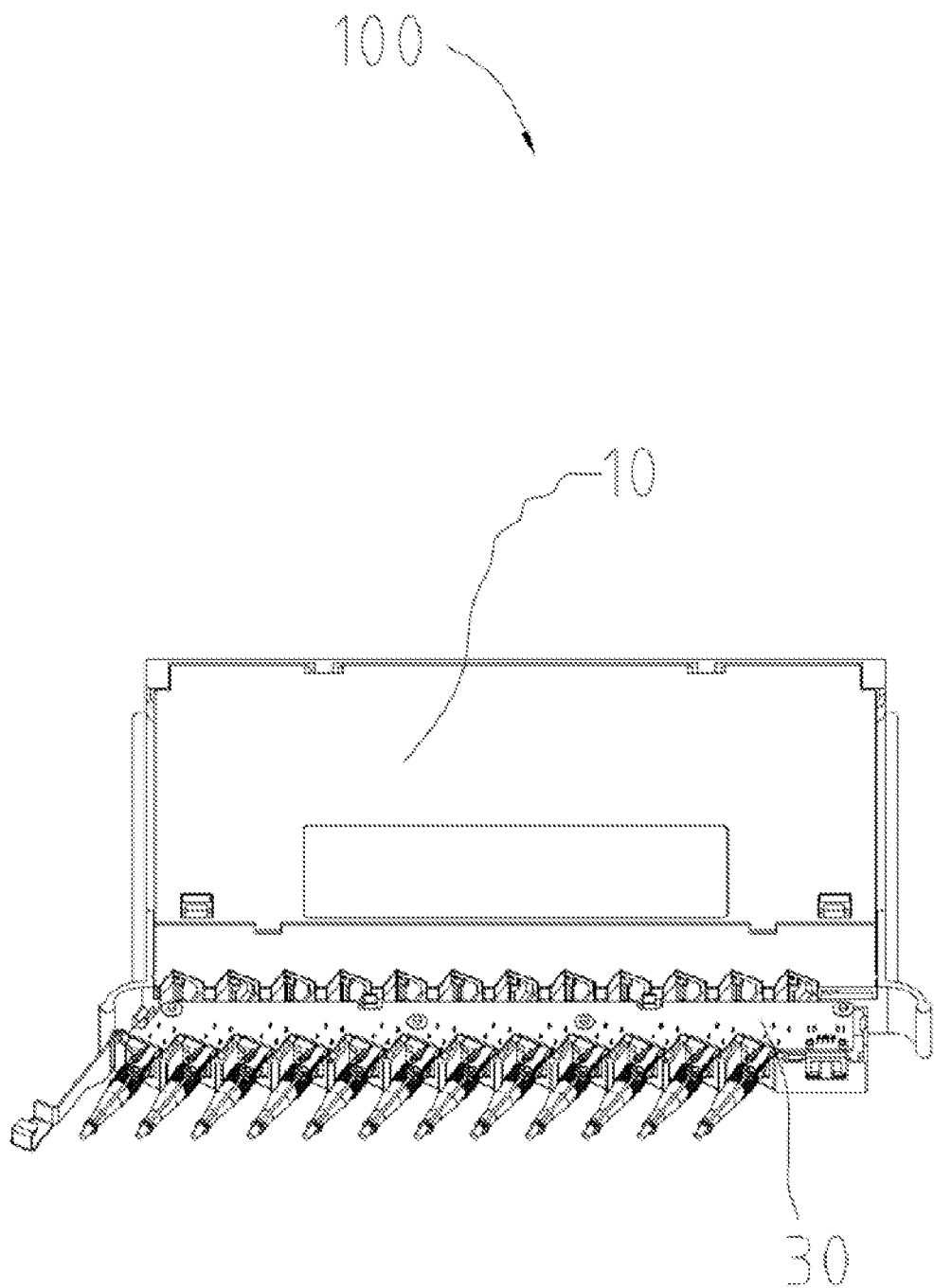
FIG. 1 is a schematic assembly view of a cable distribution device for an optical network according to an implementation manner of the present invention.

Referring to FIG. 1, FIG. 1 shows a cable distribution device 100 for an optical network according to a first implementation manner of the present invention. The cable distribution device 100 for an optical network includes a tray 10 and a cable distribution structure 30 for an intelligent optical network, and the cable distribution structure 30 for an intelligent optical network is installed on the tray 10.

Figure 3:
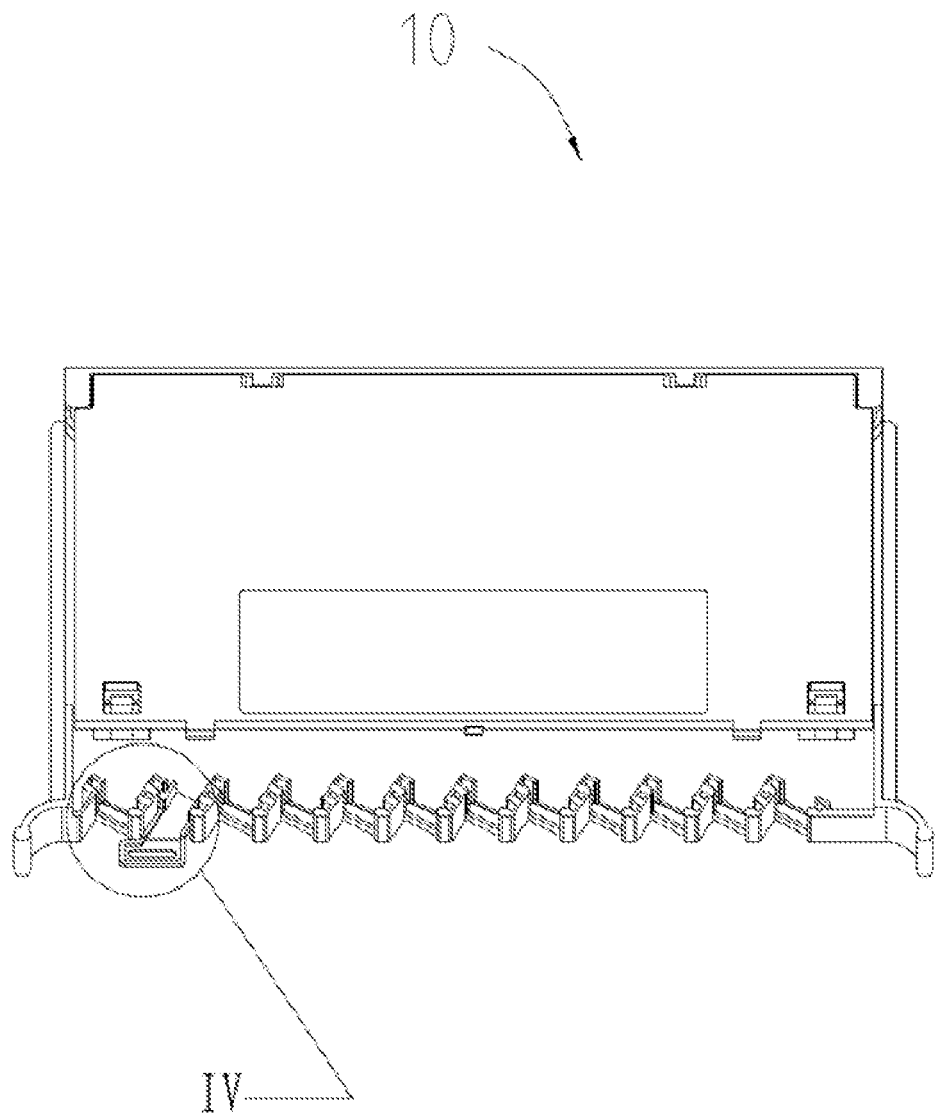
FIG. 3 is a schematic assembly view of a tray and attachment plates shown in FIG. 1.
Figure 4:
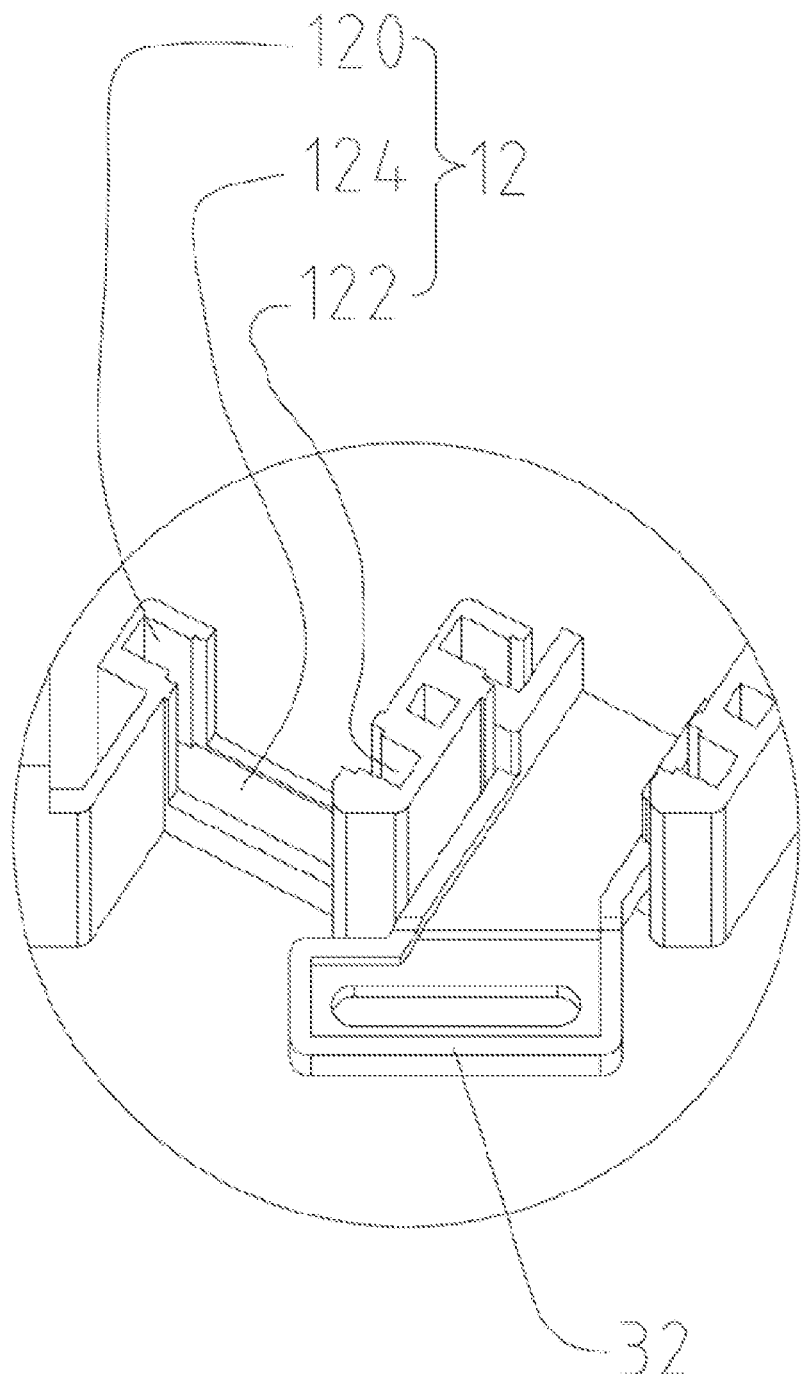
FIG. 4 is an enlarged schematic view of a circle IV in FIG. 3.
Figure 5:
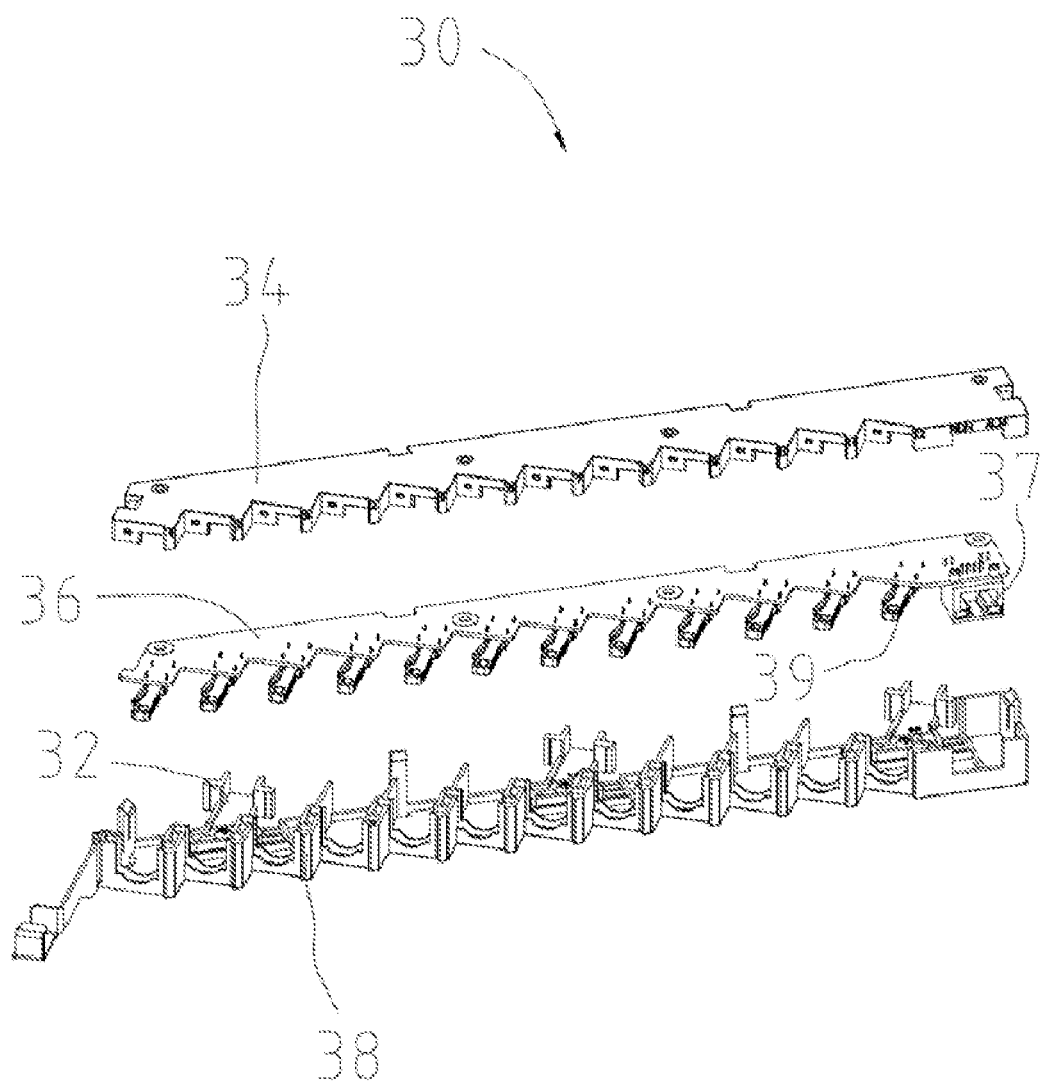
FIG. 5 is a partial schematic exploded view of a cable distribution structure for an intelligent optical network shown in FIG. 1.
Figure 6:
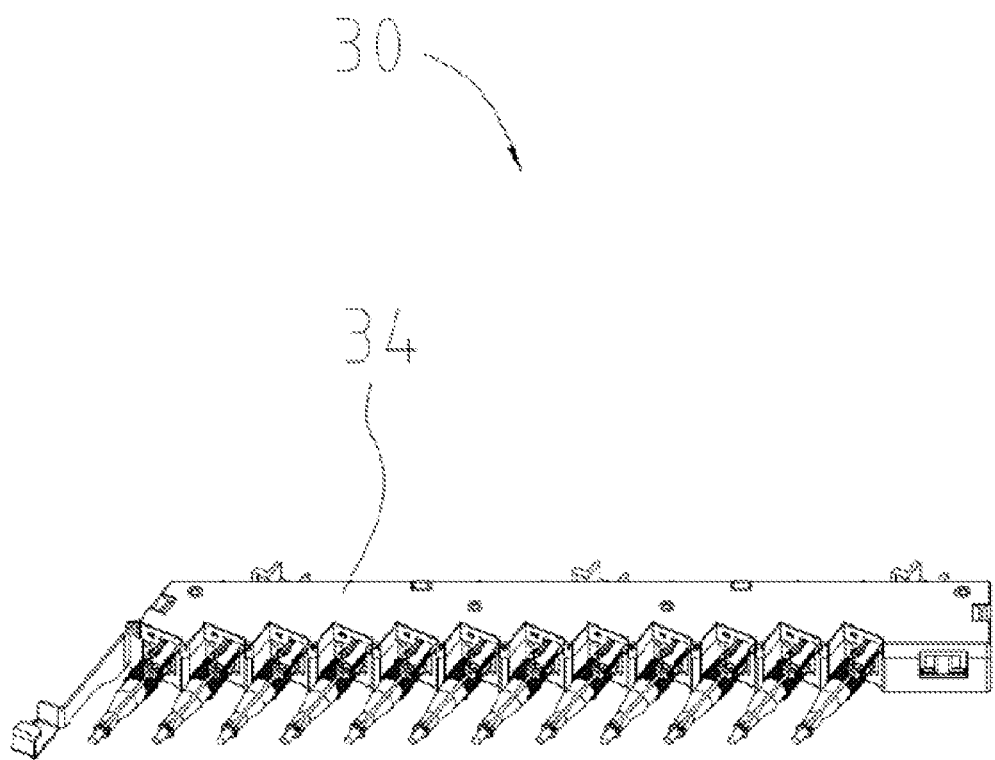
FIG. 6 is a schematic assembly view of the cable distribution structure for an intelligent optical network shown in FIG. 1.

Also referring to FIG. 3 to FIG. 5, the tray 10 is provided with multiple first interfaces 12, the cable distribution structure 30 for an intelligent optical network includes multiple attachment plates 32, an upper cover 34, a circuit board 36, and a bottom cover 38, the circuit board 36 is installed on the upper cover 34, the upper cover 34 is installed on the bottom cover 38, one end of each attachment plate 32 is installed on the bottom cover 38, and the other end of each attachment plate 32 is inserted into the first interface 12 of the tray 10, so that the cable distribution structure 30 for an intelligent optical network is installed on the tray 10.

In this implementation manner, the tray 10 and a tray in an existing ODN have a same structure but different functions. Each of the first interfaces 12 and an interface of the existing tray have a same structure but different functions. A difference between the tray in the existing ODN and the tray 10 in the present invention lies in that: An interface of the tray in the existing ODN is configured to install a standard SC (Square Connector) or FC (Ferrule Connector) type adapter, but the first interface 12 in the present invention is configured to install the attachment plate 32.

In this implementation manner, the attachment plate 32 has a same width and height as those of the standard SC or FC type adapter, so that the attachment plate 32 may also be compatible with an FC or SC type tray in an existing network, thereby expanding an application range.

According to the cable distribution device 100 for an optical network in the present invention, a cable distribution structure 30 for an intelligent optical network may be installed on a tray 10 by using attachment plates 32, so that in a process of transforming an ODN into an IODN, the ODN can be transformed into the IODN without needing to transform a structure of the tray 10 and to disassemble the tray 10, that is, without needing to transform the structure of the tray 10 and to interrupt an optical fiber transmission service, thereby solving problems in the prior art of high costs and inconvenience to a user that are caused by transformation of the tray 10.

Figure 2:
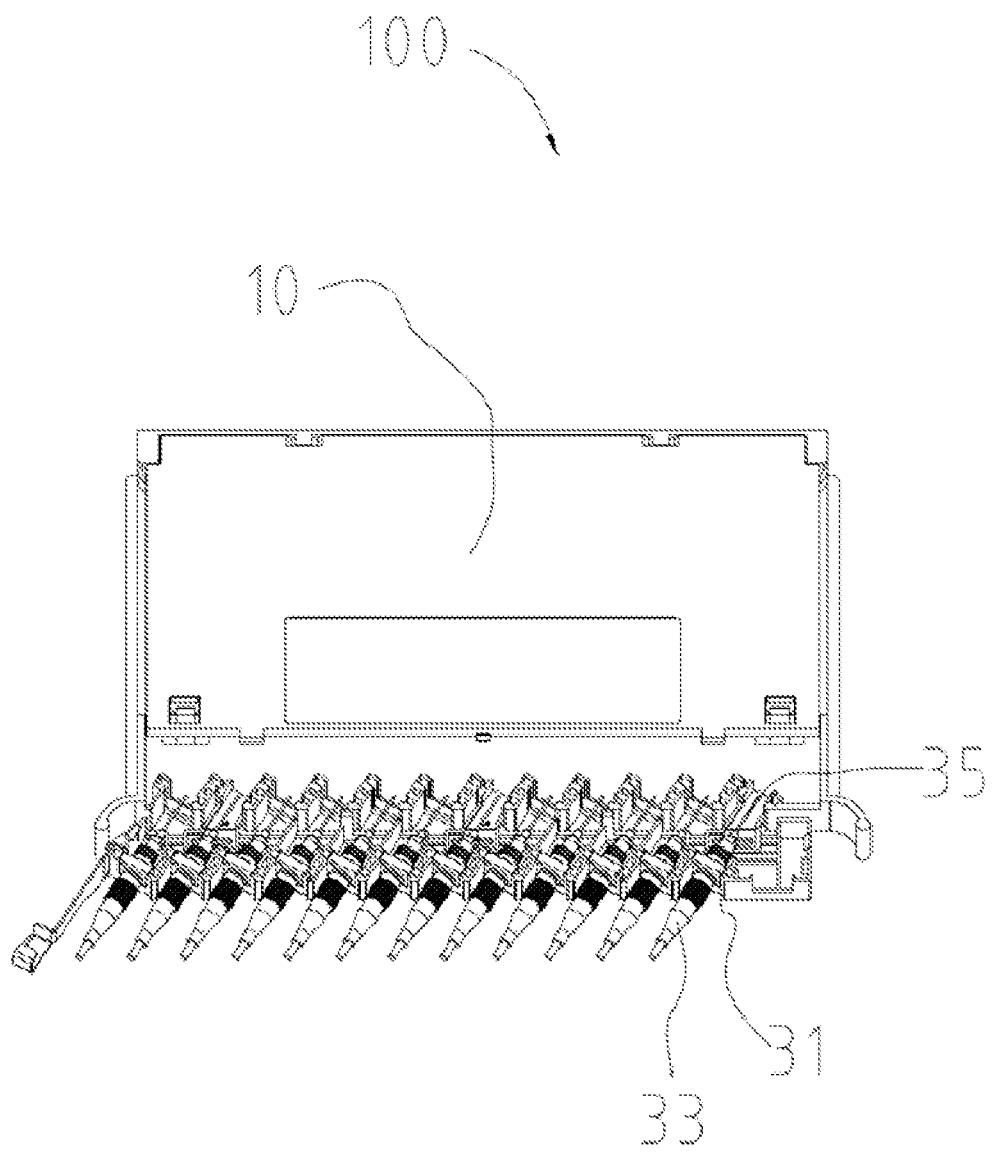
FIG. 2 is a partial schematic assembly view of the cable distribution device for an optical network shown in FIG. 1.
Figure 7:
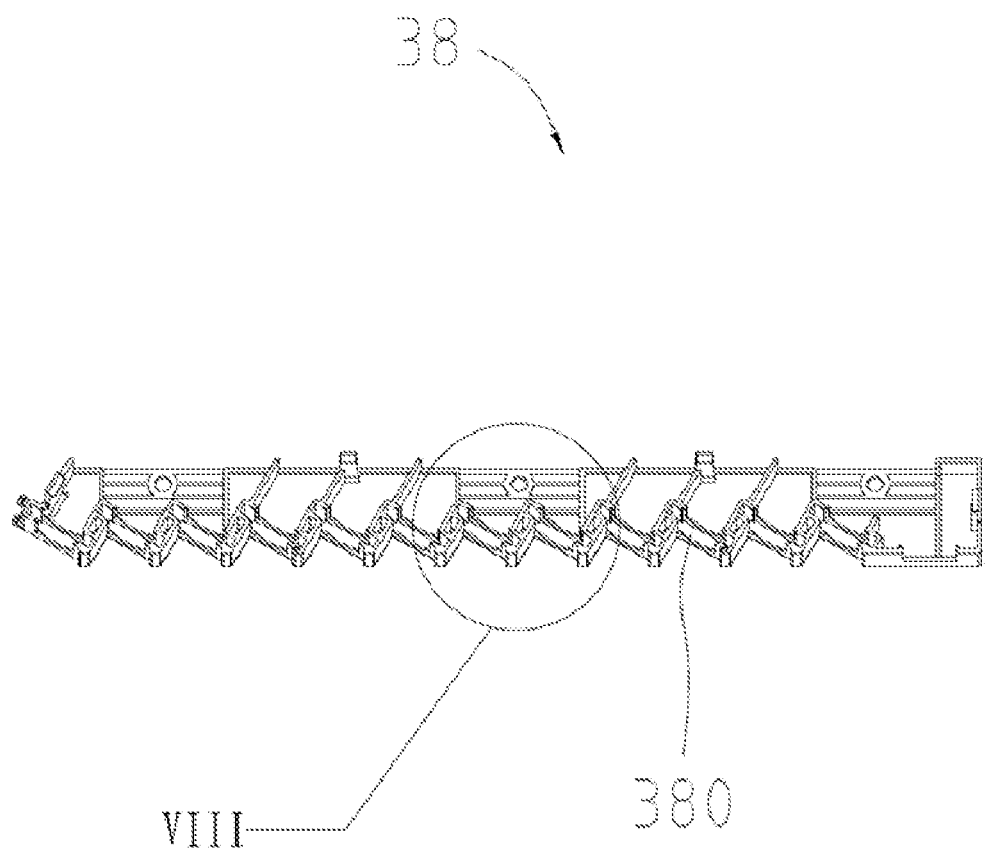
FIG. 7 is a schematic three-dimensional view of a bottom cover shown in FIG. 1.
Figure 8:
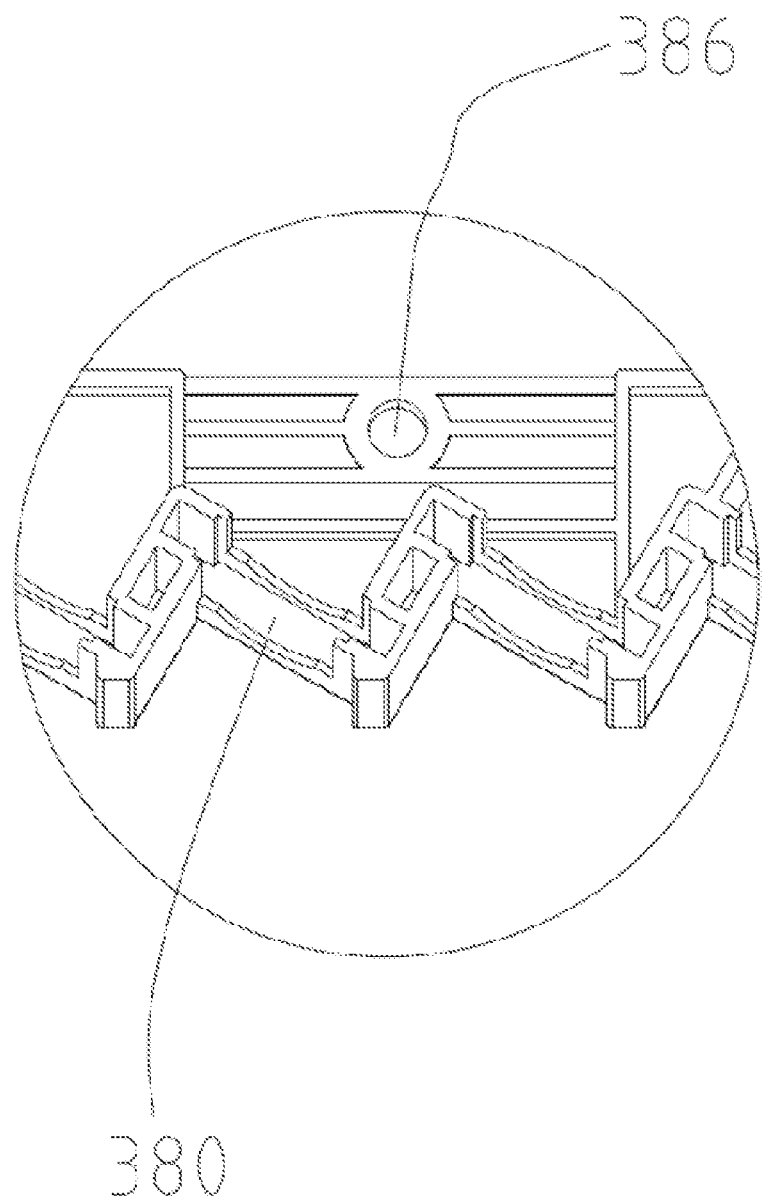
FIG. 8 is an enlarged schematic view of a circle VII in FIG. 7.
Figure 9:
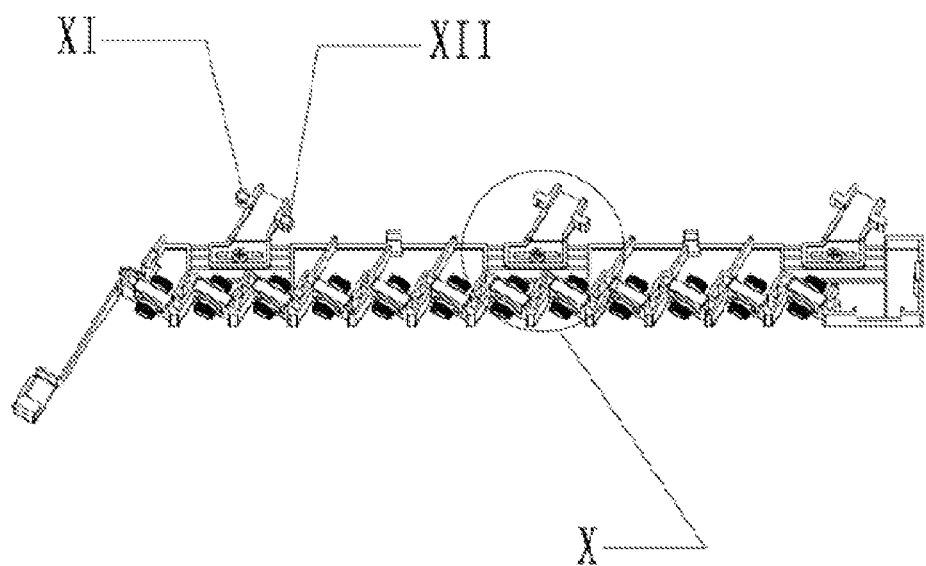
FIG. 9 is a schematic assembly view of the bottom cover and the attachment plates shown in FIG. 1.

Also referring to FIG. 2, FIG. 7, and FIG. 8, as a further improvement on the present invention, the cable distribution structure 30 for an intelligent optical network includes multiple adapters 31, where the bottom cover 38 is provided with multiple second interfaces 380, and the adapter 31 is installed on the second interface 380.

In this implementation manner, the adapter 31 is a standard SC or FC type adapter 31.

As shown in FIG. 2, as a further improvement on the present invention, the cable distribution structure 30 for an intelligent optical network further includes multiple fiber patch cords 33 and multiple pigtails 35, the fiber patch cord 33 is installed at one end of the adapter 31, and the pigtail 35 is installed at the other end of the adapter 31, that is, the fiber patch cord 33 is electrically connected to the pigtail 35 by using the adapter 31.

As shown in FIG. 5, as a further improvement on the present invention, the cable distribution structure 30 for an intelligent optical network further includes a control interface 37, and the control interface 37 is disposed at one end of the circuit board 36 and is configured to implement functions of reading and writing port information.

In this implementation manner, the control interface 37 is fastened to the circuit board 36 by using a screw.

As a further improvement on the present invention, the cable distribution structure 30 for an intelligent optical network further includes multiple chips 39, where the chip 39 is fastened to one side edge of the circuit board 36 and is electrically connected to the control interface 37, and the chip 39 is configured to record the port information and control the functions of reading and writing the port information.

In this implementation manner, the chip 39 is installed on the circuit board 36 in a buckle-and-hole fit manner.

In another implementation manner, the circuit board 36, the control interface 37, and the chip 39 may be integrated as a whole.

In this implementation manner, an eID (Electronic Identification) is embedded in the chip 39, so as to implement intelligent management of the cable distribution device 100 for an optical network, such as identification and management of an optical fiber connection, an optical fiber intelligent indication or intelligent management of an optical splitter. In addition, a site tool PDA (Personal Digital Assistant) is introduced, and in conjunction with the PDA, real-time communication between the ODN network and an inventory management system is implemented by using a wide area wireless network or a wired broadband network;

communication between the PDA and the IODN is implemented by using a USB port, and temporary power is provided for the IODN.

Also referring to FIG. 3, FIG. 4, FIG. 9, and FIG. 10, as a further improvement on the present invention, each of the first interfaces 12 is provided with a first slot 120, a second slot 122, and a receiving groove 124, and the first slot 120 and the second slot 122 are located at two sides of the receiving groove 124 and are in communication with the receiving groove 124. The attachment plate 32 includes a first clamping portion 320, a second clamping portion 322, and a body 324, and the first clamping portion 320 and the second clamping portion 322 protrude from two sides of one end of the body 324. During installation, the body 324 is received in the receiving groove 124, the first clamping portion 320 is clamped in the first slot 120, and the second clamping portion 322 is clamped in the second slot 122, so that the attachment plate 32 is installed on the tray 10.

Figure 10:
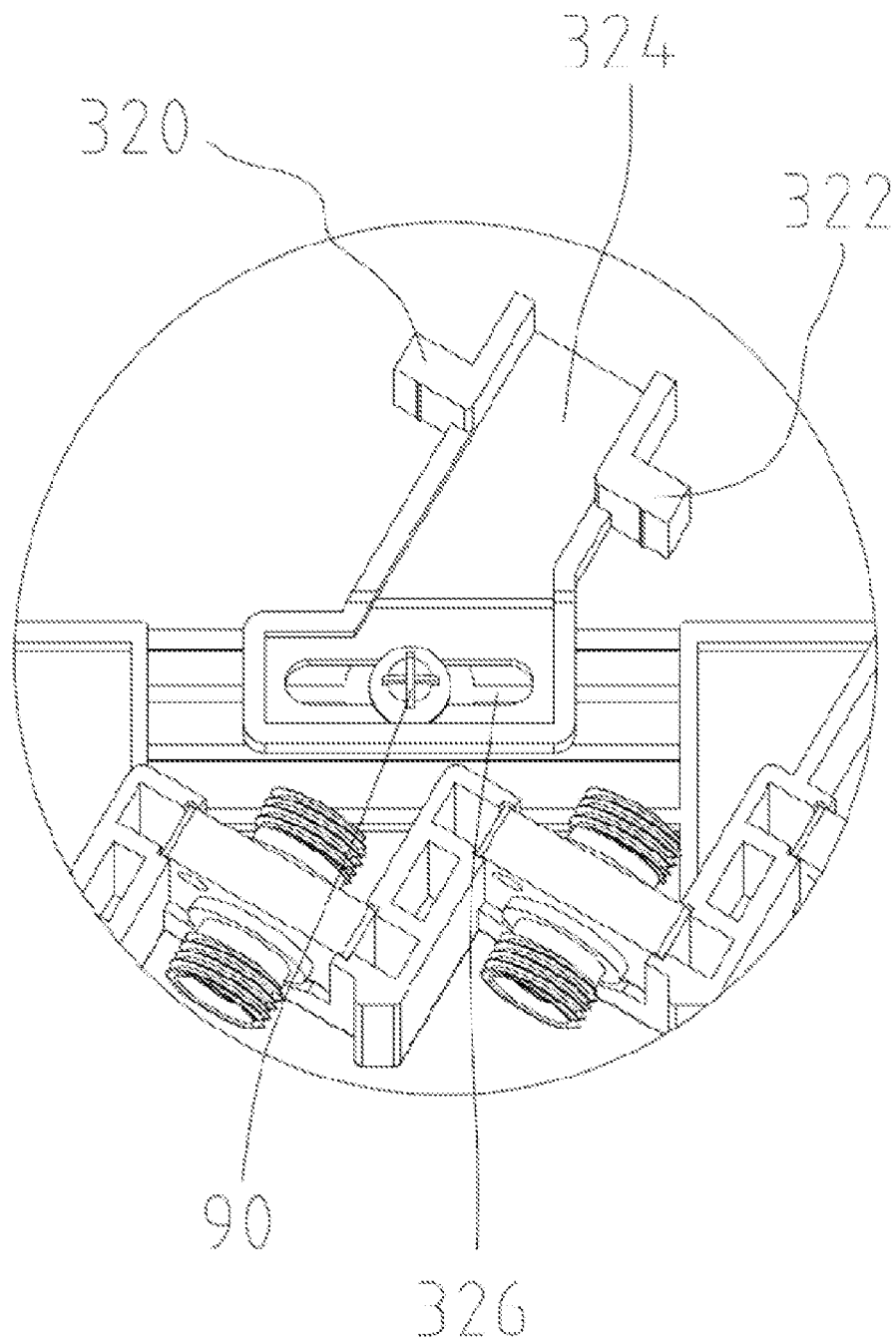
FIG. 10 is an enlarged schematic view of a circle X in FIG. 9.
Figure 11:
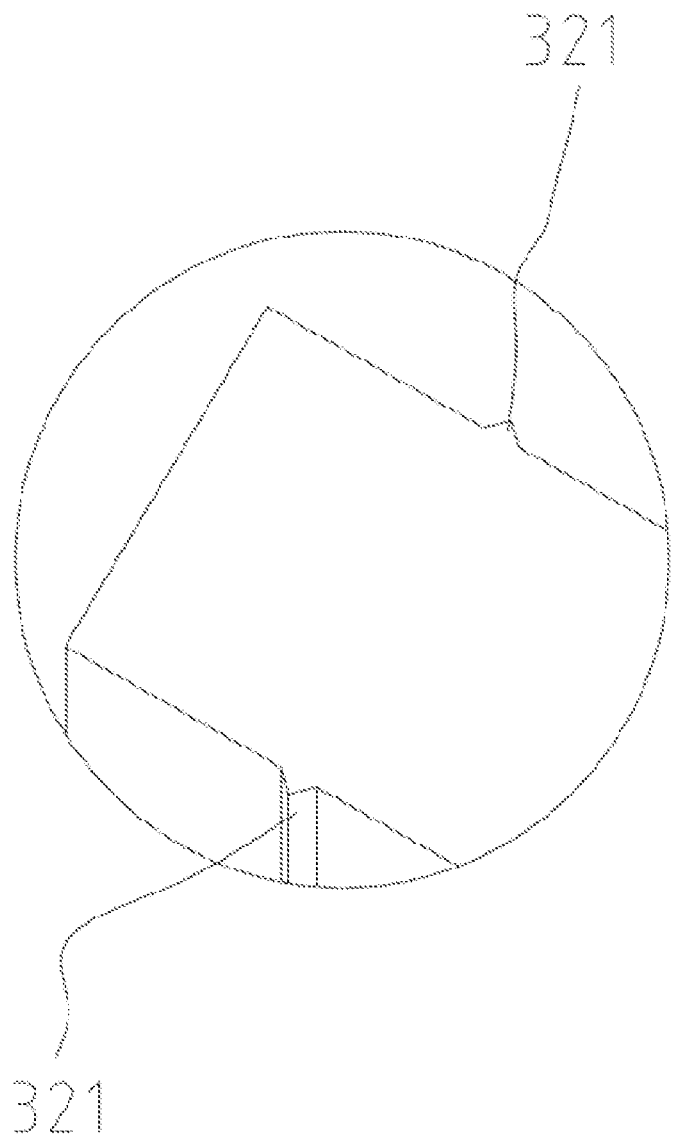
FIG. 11 is an enlarged schematic view of a circle XI in FIG. 9.

Also referring to FIG. 10 and FIG. 11, in this implementation manner, the first clamping portion 320 is provided with a pair of first projecting portions 321, and the first projecting portions 321 separately protrude from two side walls, which are opposite to each other, of the first clamping portion 320 towards the first slot 120. When the first clamping portion 320 is inserted into the first slot 120, the first projecting portion 321 is in interference fit with an inner wall of the first slot 120, so that it is difficult for the first clamping portion 320 to be separated from the first slot 120, thereby increasing reliability of installation between the attachment plate 32 and the tray 10.

In another implementation manner, the first clamping portion 320 may be provided with one first projecting portion 321, that is, one of side walls of the first clamping portion 320 is provided with a first projecting portion 321, or two side walls of the first clamping portion 320 are separately provided with multiple first projecting portions 321, for example, 2 first projecting portions 321, 3 first projecting portions 321, or 4 first projecting portions 321.

Figure 12:
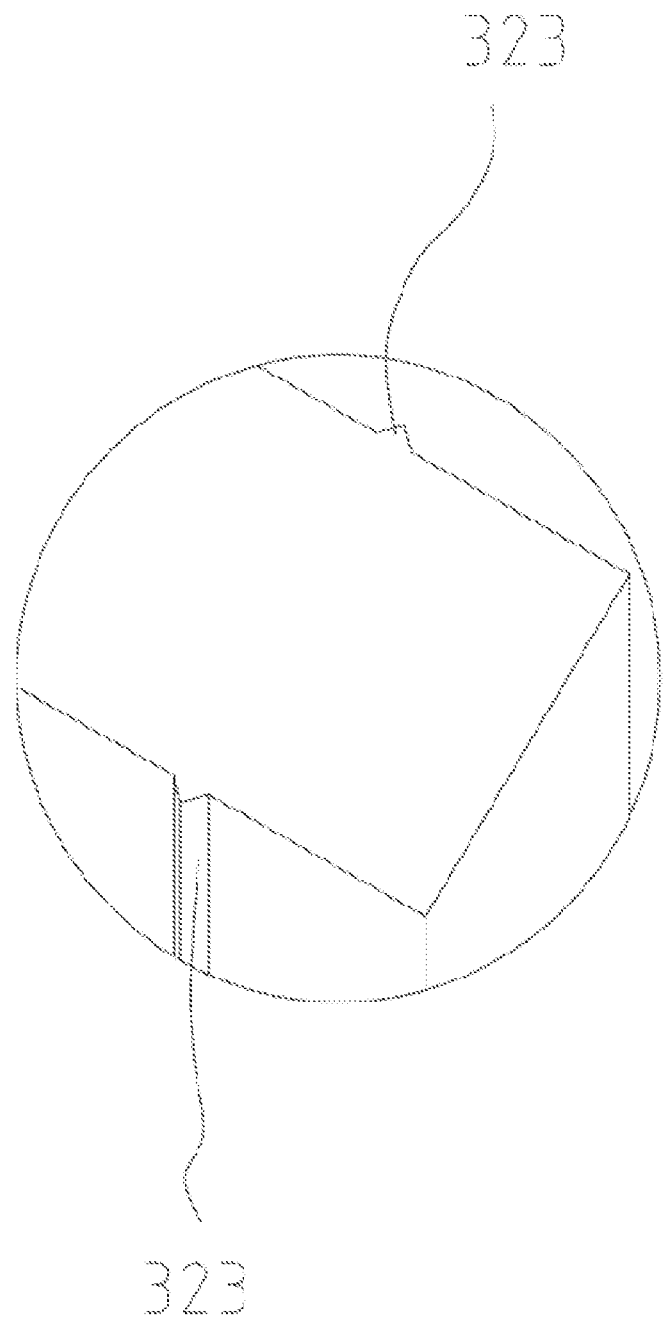
FIG. 12 is an enlarged schematic view of a circle XII in FIG. 9.

Also referring to FIG. 10 and FIG. 12, in this implementation manner, the second clamping portion 322 is provided with a pair of second projecting portions 323, and the second projecting portions 323 separately protrude from two side walls, which are opposite to each other, of the second clamping portion 322 towards the second slot 122. When the second clamping portion 322 is inserted into the second slot 122, the second projecting portion 323 is in interference fit with an inner wall of the second slot 122, so that it is difficult for the second clamping portion 322 to be separated from the second slot 122, thereby increasing reliability of installation between the attachment plate 32 and the tray 10.

In another implementation manner, the second clamping portion 322 may be provided with one second projecting portion 323, that is, one of side walls of the second clamping portion 322 is provided with a second projecting portion 323, or two side walls of the second clamping portion 322 are separately provided with multiple second projecting portions 323, for example, 2 second projecting portions 323, 3 second projecting portions 323, or 4 second projecting portions 323.

In this implementation manner, a structure of the first projecting portion 321 is the same as that of the second projecting portion 323.

In another implementation manner, a structure of the first projecting portion 321 may also be different from that of the second projecting portion 323.

In another implementation manner, one of the first clamping portion 320 and the second clamping portion 322 may be provided with a projecting portion.

Also referring to FIG. 7, FIG. 8, and FIG. 10, as a further improvement on the present invention, the attachment plate 32 is further provided with a positioning groove 326, the positioning groove 326 is located at the other end of the body 324, the bottom cover 38 is provided with a positioning hole 386, and the cable distribution structure 30 for an intelligent optical network further includes a fastener 90. During installation, the fastener 90 passes through the positioning groove 326 and is fastened to the positioning hole 386, so that the attachment plate 32 is installed on the bottom cover 38.

In this implementation manner, the positioning groove 326 is strip-shaped, the positioning hole 386 is a threaded hole, and the fastener 90 is a screw.

Also referring to FIG. 13 to FIG. 16, the positioning groove 326 is strip-shaped, so that the attachment plate 32 can be rotated by an angle relative to the bottom cover 38, and the attachment plate 32 can also be moved by a distance relative to the bottom cover 38.

Figure 13:
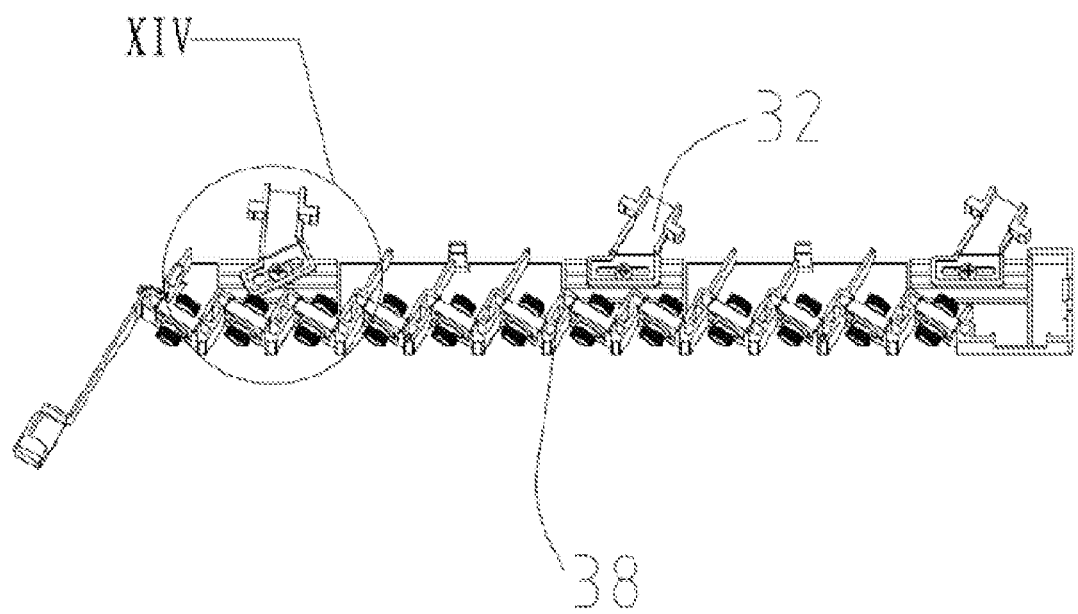
FIG. 13 is similar to FIG. 9, but in FIG. 13 one attachment plate is rotated by an angle relative to the bottom cover.
Figure 14:
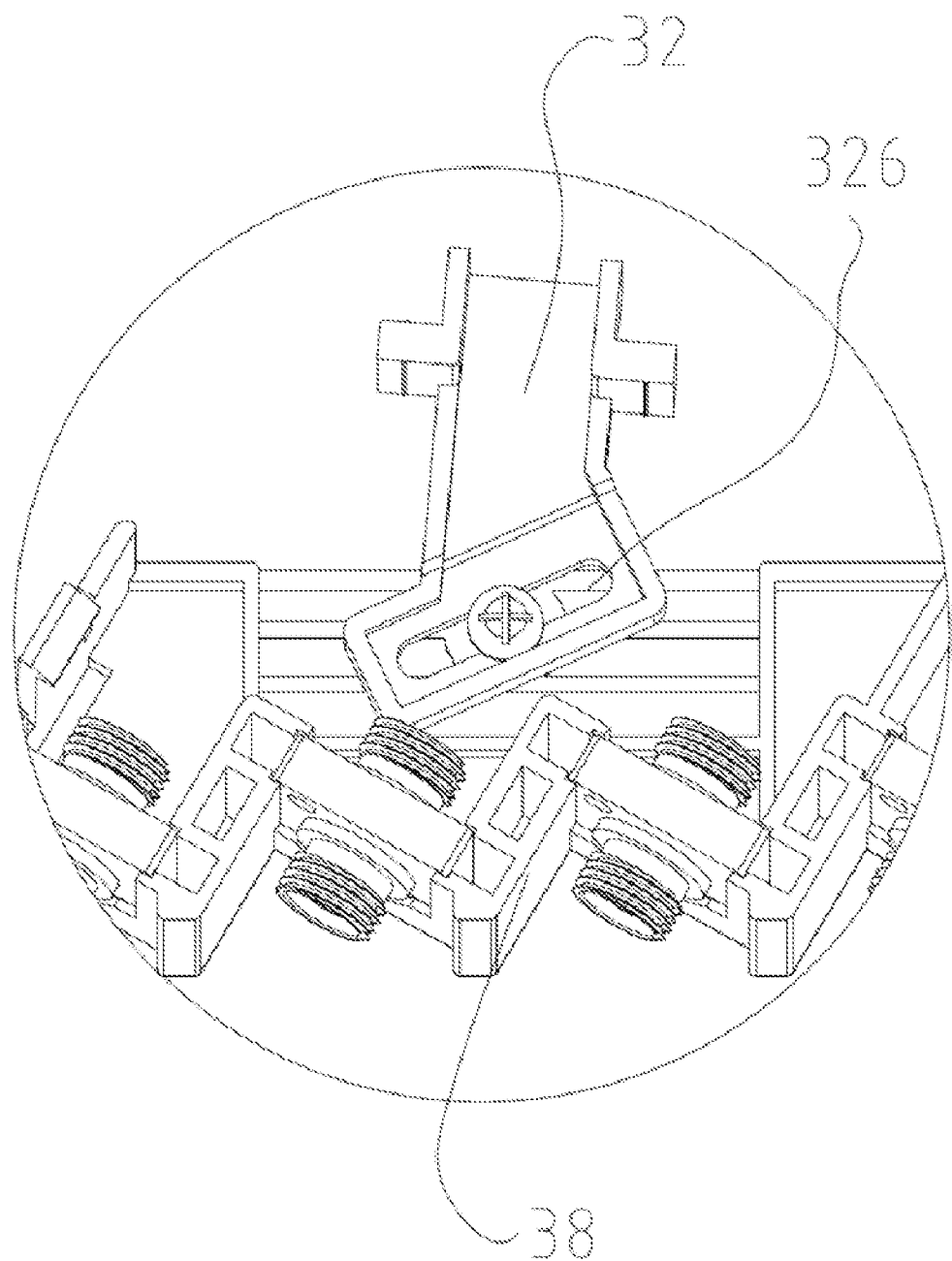
FIG. 14 is an enlarged schematic view of a circle XIV in FIG. 13.

Specifically, as shown in FIG. 13 and FIG. 14, the screw is loosened, so that the attachment plate 32 is rotated by an angle relative to the bottom cover 38, and the screw is then tightened to adjust an angle between the attachment plate 32 and the bottom cover 38, thereby adjusting an angle between the attachment plate 32 and the tray 10.

Because the angle between the attachment plate 32 and the tray 10 is adjustable, during use, when a position of the attachment plate 32 does not correspond to a position of the first interface 12 of the tray 10, that is, the attachment plate 32 can be inserted into the first interface 12 only when the attachment plate 32 is rotated clockwise or counterclockwise by an angle, the screw is loosened to make the attachment plate 32 rotate by an angle relative to the bottom cover 38, so that after the attachment plate 32 may be inserted into the first interface 12 of the tray 10, the screw may be tightened subsequently. In other words, because the angle between the attachment plate 32 and the tray 10 is adjustable, the attachment plate 32 is applicable to requirements of different manufacturers for various placement angles of trays 10, thereby expanding an application range of the attachment plate 32, and also reducing part replacement costs.

In this implementation manner, the angle between the attachment plate 32 and the bottom cover 38 is adjusted by placing the screw at different positions of the positioning groove 326.

Figure 15:
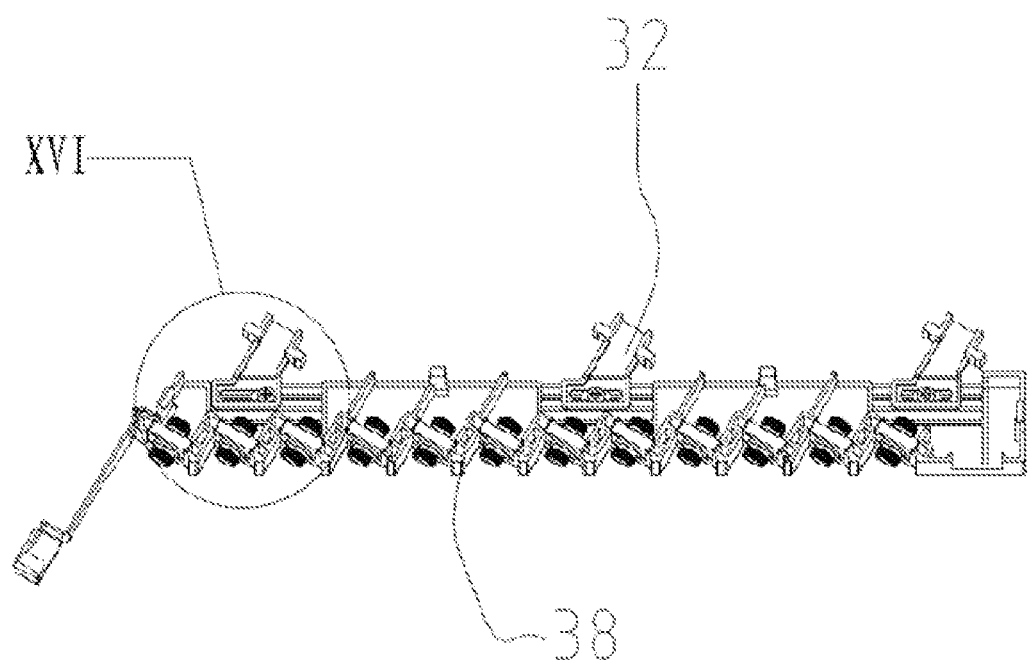
FIG. 15 is similar to FIG. 9, but in FIG. 15 one attachment plate is moved by a distance relative to the bottom cover.
Figure 16:
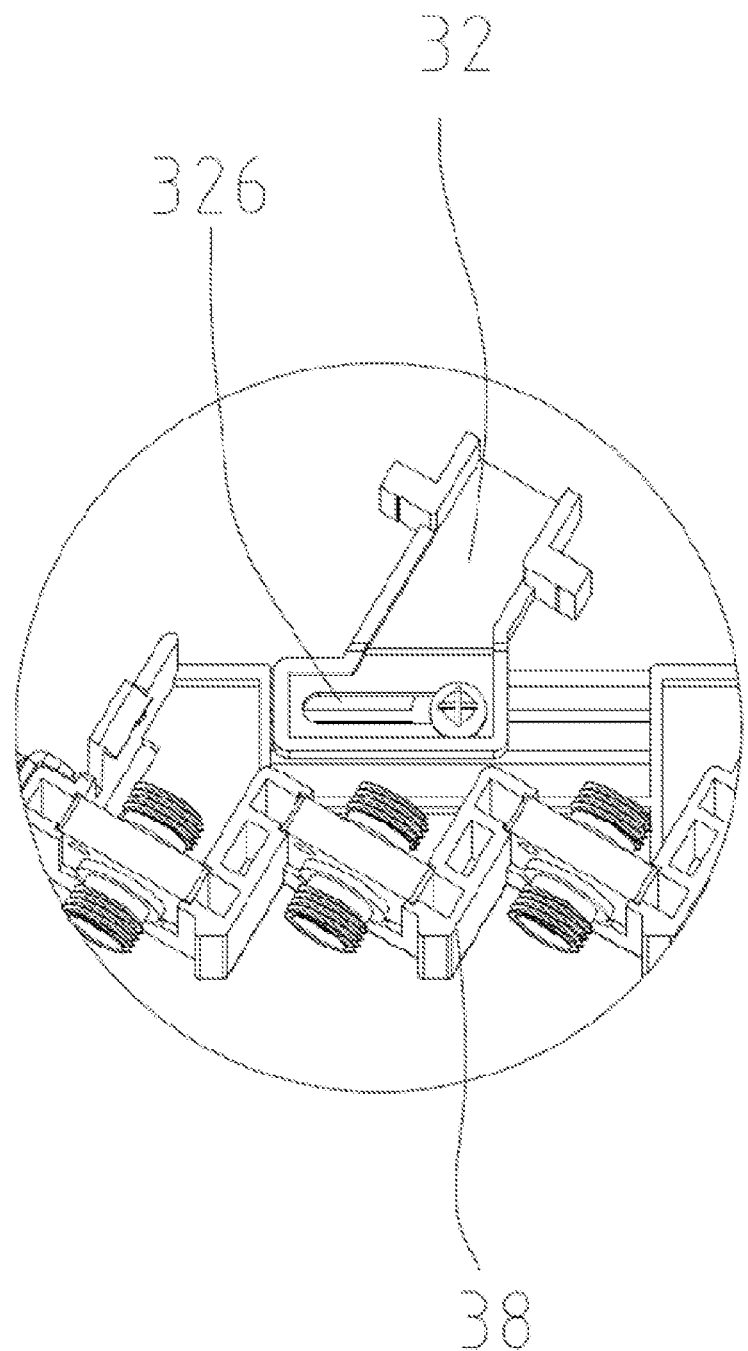
FIG. 16 is an enlarged schematic view of a circle XVI in FIG. 15.

Further, as shown in FIG. 15 and FIG. 16, the screw is loosened, so that the attachment plate 32 is moved by a distance relative to the bottom cover 38. Then the screw is tightened, so as to adjust a displacement between the attachment plate 32 and the bottom cover 38, and further a displacement between the attachment plate 32 and the tray 10 may also be adjusted.

Because the displacement between the attachment plate 32 and the tray 10 is adjustable, during use, when a position of the attachment plate 32 does not correspond to a position of the first interface 12 of the tray 10, that is, the attachment plate 32 can be inserted into the first interface 12 only when the attachment plate 32 is moved left or right by a distance, the screw is loosened to make the attachment plate 32 move by a distance relative to the bottom cover 38, so that after the attachment plate 32 may be inserted into the first interface 12 of the tray 10, the screw may be tightened subsequently. In other words, because the displacement between the attachment plate 32 and the tray 10 is adjustable, the attachment plate 32 is applicable to various distances between two adjacent first interfaces 12 of trays 10 from different manufacturers, thereby expanding an application range of the attachment plate 32, and also reducing part replacement costs.

In this implementation manner, the displacement between the attachment plate 32 and the bottom cover 38 is adjusted by placing the screw at different positions of the positioning groove 326.

In other words, because the positioning groove 326 is strip-shaped, the angle and displacement between the attachment plate 32 and the tray 10 are adjustable, that is, positions of the attachment plate 32 and the tray 10 are adjustable. Therefore, the attachment plate 32 in the present invention is applicable to trays 10 from different manufacturers, thereby expanding an application range of the cable distribution device 100 for an optical network in the present invention, and reducing part replacement costs.

Also referring to FIG. 1 to FIG. 16, during assembly, the adapter 31, the fiber patch cord 33, and the pigtail 35 in the existing network are removed from the tray 10 and are installed on the bottom cover 38, one end of each attachment plate 32 is inserted into the first interface 12 of the tray 10, the other end of each attachment plate 32 is fastened to the bottom cover 38, and the upper cover 34 installed with the circuit board 36 is installed on the bottom cover 38, and the eID on the chip 39 is bound to the fiber patch cord 33, so that the tray 10, the attachment plate 32, the upper cover 34, the circuit board 36, the adapter 31, the fiber patch cord 33, the pigtail 35, and the bottom cover 38 are assembled into the cable distribution device 100 for an optical network.

An adapter 31, a fiber patch cord 33, and a pigtail 35 in the present invention are installed on a bottom cover 38, and a circuit board 36 having a chip 39 and a control interface 37 is also fastened to the bottom cover 38 by using an upper cover 34, that is, a cable distribution device 100 for an optical network in the present invention integrates intelligent functions to form a modularized cable distribution structure 30 for an intelligent optical network, and is then fastened to a tray 10 in an existing network by using an attachment plate 32, so that during transformation of an ODN into an IODN, the tray 10 in the existing network does not need to be replaced and an optical fiber transmission service does not need to be interrupted, provided that the cable distribution structure 30 for an intelligent optical network having intelligent functions needs to be installed on the tray 10 in the existing network by using the attachment plate 32. Such a transformation manner not only reduces transformation costs but also increases convenience to a user.

Further, a positional relationship between the attachment plate 32 and the tray 10 is adjustable, so that the cable distribution structure 30 for an intelligent optical network in the present invention is applicable to trays 10 from different manufacturers, thereby expanding a use range of the cable distribution structure 30 for an intelligent optical network.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A cable distribution device for an optical distribution network, the cable distribution device comprising:
   a tray having multiple first interfaces;
   a cable distribution structure being a component located at a side of the tray; and
   multiple attachment plates fixing the cable distribution structure to the tray,
   wherein one end of each of the multiple attachment plates is fastened with a fastener to the cable distribution structure,
   wherein another end of each of the multiple attachment plates is clamped into a respective one of the multiple first interfaces,
   wherein each of the multiple first interfaces has a first slot, a second slot, and a receiving groove,
   wherein the first slot and the second slot are located at opposing sides of the receiving groove and adjoin the receiving groove,
   wherein each of the multiple attachment plates comprises a first clamping portion, a second clamping portion and a body,
   wherein the first clamping portion and the second clamping portion protrude from opposing sides at a first end of the body,
   wherein the body is configured to be received in the receiving groove, and
   wherein the first clamping portion is configured to clamp in the first slot and the second clamping portion configured to clamp in the second slot, so that the attachment plate is installed on the tray.

2. The cable distribution device according to claim 1, wherein the cable distribution structure further comprises multiple adapters, wherein a bottom cover has multiple second interfaces, and wherein each of the multiple adapters is installed on a respective one of the multiple second interfaces.

3. The cable distribution device according to claim 2, wherein the cable distribution structure further comprises multiple fiber patch cords and multiple pigtails, wherein each of the multiple fiber patch cords is installed at one end of a respective one of the multiple adapters, and wherein each of the multiple pigtails is installed at another end of a respective one of the multiple adapters and is electrically connected to a respective one of the multiple fiber patch cords.

4. The cable distribution device according to claim 3, wherein the cable distribution structure further comprises a control interface, and wherein the control interface is disposed at one end of a circuit board and is configured to implement functions of reading and writing port information.

5. The cable distribution device according to claim 4, wherein the cable distribution structure further comprises multiple chips, wherein each of the multiple chips is fastened to a side edge of the circuit board and is fixedly connected to a respective one of the multiple fiber patch cords, and wherein each of the multiple chips is electrically connected to the control interface and is configured to record the port information and control the functions of reading and writing the port information.

6. The cable distribution device according to claim 1, wherein the cable distribution structure comprises an upper cover, a circuit board and a bottom cover, and wherein the circuit board is installed between the bottom cover and the upper cover.

7. The cable distribution device according to claim 1, wherein the first clamping portion has at least one first projecting portion, and wherein the at least one first projecting portion has an interference fit with an inner wall of the first slot.

8. The cable distribution device according to claim 7, wherein the second clamping portion has at least one second projecting portion, and wherein the second projecting portion has interference fit with the inner wall of the second slot.

9. A cable distribution device for an optical distribution network, the cable distribution device comprising:
a tray having multiple first interfaces; and
a cable distribution structure installed on the tray, the cable distribution structure comprising:
multiple attachment plates;
an upper cover;
a circuit board; and
a bottom cover,
wherein the circuit board is installed on the upper cover,
wherein the upper cover is installed on the bottom cover,
wherein one end of each of the multiple attachment plates is installed on the bottom cover, and
wherein another end of each of the multiple attachment plates is inserted into a respective one of the multiple first interfaces,
wherein each of the multiple first interfaces has a first slot, a second slot, and a receiving groove,
wherein the first slot and the second slot are located at opposing sides of the receiving groove and adjoin the receiving groove,
wherein each of the multiple attachment plates comprises a first clamping portion, a second clamping portion, and a body,
wherein the first clamping portion and the second clamping portion protrude from opposing sides at a first end of the body,
wherein the body is configured to be received in the receiving groove, and
wherein the first clamping portion is configured to clamp in the first slot and the second clamping portion configured to clamp in the second slot, so that the attachment plate is installed on the tray.

10. The cable distribution device according to claim 9, wherein each of the multiple attachment plates further has a positioning groove,
wherein the positioning groove is located at a second end of the body opposite the first end,
wherein the bottom cover has a positioning hole,
wherein the cable distribution structure further comprises multiple fasteners, and
wherein each of the multiple fasteners is configured to pass through the positioning groove of a respective one of the multiple attachment plates and fasten to the positioning hole, so that respective attachment plate is installed on the bottom cover.

11. The cable distribution device according to claim 10, wherein the positioning groove has a strip shape and is configured so that relative positions of the attachment plate and the bottom cover are adjustable.

12. The cable distribution device according to claim 9, wherein the first clamping portion has at least one first projecting portion, and wherein the at least one first projecting portion has an interference fit with an inner wall of the first slot.

13. The cable distribution device according to claim 12, wherein the second clamping portion has at least one second projecting portion, and wherein the second projecting portion has interference fit with the inner wall of the second slot.

14. The cable distribution device according to claim 1, wherein the tray has a length and a width and the cable distribution structure has a length and a width, wherein the width of the tray is the same as the width of the cable distribution structure, and wherein the length of the cable distribution structure is smaller than the length of the tray.

15. A cable distribution device for an optical distribution network, the
a tray having multiple first interfaces, the tray having a length and a width;
a cable distribution structure installed at a side of the tray, the cable distribution structure having a length and a width, the cable distribution structure comprising an upper cover, a circuit board and a bottom cover, wherein the circuit board is installed between the bottom cover and the upper cover; and
multiple attachment plates fixing the cable distribution structure to the tray,
wherein one end of each of the multiple attachment plates is installed on the bottom cover,
wherein another end of each of the multiple attachment plates is inserted into a respective one of the multiple first interfaces,
wherein each of the multiple first interfaces has a first slot, a second slot, and a receiving groove,
wherein the first slot and the second slot are located at opposing sides of the receiving groove and adjoin the receiving groove,
wherein each of the multiple attachment plates comprises a first clamping portion, a second clamping portion and a body,
wherein the first clamping portion and the second clamping portion protrude from opposing sides at a first end of the body,
wherein the body is configured to be received in the receiving groove, and
wherein the first clamping portion is configured to clamp in the first slot and the second clamping portion configured to clamp in the second slot, so that the attachment plate is installed on the tray.

16. The cable distribution device according to claim 15, wherein each of the multiple attachment plates further has a positioning groove,
wherein the positioning groove is located at a second end of the body opposite the first end,
wherein the bottom cover has a positioning hole,
wherein the cable distribution structure further comprises multiple fasteners, and
wherein each of the multiple fasteners is configured to pass through the positioning groove of a respective one of the multiple attachment plates and fasten to the positioning hole, so that respective attachment plate is installed on the bottom cover.

17. The cable distribution device according to claim 15, wherein the first clamping portion has at least one first projecting portion, and wherein the at least one first projecting portion has an interference fit with an inner wall of the first slot.

18. The cable distribution device according to claim 6, wherein each of the multiple attachment plates further has a positioning groove,
wherein the positioning groove is located at a second end of the body opposite the first end,
wherein the bottom cover has a positioning hole,
wherein the cable distribution structure further comprises multiple fasteners, and
wherein each of the multiple fasteners is configured to pass through the positioning groove of a respective one of the multiple attachment plates and fasten to the positioning hole, so that respective attachment plate is installed on the bottom cover.

19. The cable distribution device according to claim 18, wherein the positioning groove has a strip shape and is configured so that relative positions of the attachment plate and the bottom cover are adjustable.

* * * * *

UNITED STATES PATENT AND TRADEMARK OFFICE
CERTIFICATE OF CORRECTION

PATENT NO. : 10,107,981 B2
APPLICATION NO. : 14/941318
DATED : October 23, 2018
INVENTOR(S) : Jinghui Chen et al.

Page 1 of 1

It is certified that error appears in the above-identified patent and that said Letters Patent is hereby corrected as shown below:

In the Claims

In Column 10, Line 4, Claim 15, delete "network, the" and insert --network, the cable distribution device comprising:--.

Signed and Sealed this
Nineteenth Day of February, 2019

Andrei Iancu
*Director of the United States Patent and Trademark Office*